(12) United States Patent
Chen et al.

(10) Patent No.: US 7,516,131 B2
(45) Date of Patent: Apr. 7, 2009

(54) METHOD AND APPARATUS FOR RANKING-BASED INFORMATION PROCESSING

(75) Inventors: Mao Chen, Green Island, NY (US); Mitchell A. Cohen, Yorktown Heights, NY (US); Rakesh Mohan, Cortlandt Manor, NY (US); Ram Rajagopal, Berkeley, CA (US); Jakka Sairamesh, New York, NY (US); Stephen V. Stibler, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 11/437,222

(22) Filed: May 19, 2006

(65) Prior Publication Data

US 2007/0271269 A1 Nov. 22, 2007

(51) Int. Cl.
*G06F 17/30* (2006.01)
(52) U.S. Cl. .............................................. 707/5; 707/7
(58) Field of Classification Search ........................ None
See application file for complete search history.

(56) References Cited

U.S. PATENT DOCUMENTS

| 7,249,058 | B2* | 7/2007 | Kim et al. ..................... 705/26 |
|---|---|---|---|
| 2002/0032629 | A1* | 3/2002 | Siegel et al. .................. 705/36 |
| 2004/0003132 | A1* | 1/2004 | Stanley et al. ................ 709/316 |
| 2004/0107171 | A1 | 6/2004 | Basak et al. ................... 706/16 |
| 2004/0267770 | A1* | 12/2004 | Lee ............................. 707/100 |
| 2005/0222975 | A1* | 10/2005 | Nayak et al. ................... 707/3 |
| 2005/0289102 | A1* | 12/2005 | Das et al. ...................... 707/1 |
| 2006/0010443 | A1 | 1/2006 | Lahti et al. ................... 718/100 |

OTHER PUBLICATIONS

Abadi et al., "The Design of the Borealis Stream Processing Engine," Second Biennial Conf on Innovative Data Systems Research (CIDR 2005) Asilomar, CA, Jan. 2005.

Arasu et al, "STREAM: The Stanford Stream Data Manager (Demonstration Description)," In Proc of the ACM Intl Conf on Management of Data (SIGMOD 2003), Jun. 2003.

Arens et al, "Query Reformulation for Dynamic Information Integration," Journal of Intelligent Information Systems, 1999.

Dalvi et al, "Adversarial Classification," In Proc of ACM SIGKDD, 2004.

Genesereth et al, "Infomaster: An Information Integration System," In Proceedings of the ACM SIGMOD Conference, May 1997.

(Continued)

*Primary Examiner*—Charles Rones
*Assistant Examiner*—Yuk Ting Choi
(74) *Attorney, Agent, or Firm*—Ryan, Mason & Lewis, LLP

(57) ABSTRACT

Techniques are provided for ranking-based information processing. Method steps can include integrating information from at least one source (a plurality of heterogeneous sources can also be handled), to obtain integrated information; mapping the integrated information to at least one application; ranking the integrated information based on the mapping and on ranking criteria from a knowledge base; and processing the integrated information, based on the ranking, to obtain processed integrated information. Optionally, the processing step includes formatting the processed integrated information for a plurality of applications.

1 Claim, 4 Drawing Sheets

OTHER PUBLICATIONS

"Google ranking Technology," downloaded on Nov. 16, 2006 http://www.google.com/technology/.

Haas et al., Optimizing Queries across Diverse Data Sources, VLDB, pp. 276-285 (1997).

Subrahmanian et al, "HERMES: A Heterogeneous Reasoning and Mediator System," Technical Report, University of Maryland (1995).

Hu et al, "Mining and Summarizing Customer Reviews," In Proc of ACM SIGKDD (2004).

J. Kleinberg, "Authoritative Sources in a Hyperlinked Environment," Journal of the ACM 46 (1999).

Kumar et al, "A Graph-Theoretic Approach to Extract Storylines from Search Results," In Proc of ACM SIGKDD (2004).

Levy et al, "Querying Heterogeneous Information Sources Using Source Desceiptions," In Proceedings of VLDB (1996).

Madhavan et al, "Composiing Mappings Among Data Sources," In VLDB, pp. 572-583 (2003).

Chawathe et al, "The TSIMMIS Project: Integration of Heterogeneous Information Sources," in Proceedings of 16th Meeting of the Information Processing Society of Japan (1994).

Garcia-Molina et al., "The TSIMMIS Approach to Mediation: Data Models and Languages," Journal of Intelligent Information Systems, vol. 8(2), pp. 117-132 (1997).

"Web Services Activity," downloaded on Nov. 16, 2006, http//www w3c org/2002/ws/.

Zhang et al., "Using Bayesian Priors to Combine Classifiers for Adaptive Filtering," In Proceedings of SIGIR (2004).

Chen et al., "Semantic Query Transformation for Integrating Web Information Sources," In Proc. of ICEIS 2005.

Debreu, G., "Continuity Properties of paretian utility," International Economic Review 5, pp. 285-293 (1964).

Sairamesh, et al., "Dealer Collaboration: Transforming the Value Chain through Integration and Relationships," In Proc of CEC 2004, pp. 325-329 (2004.

* cited by examiner

METHOD AND APPARATUS FOR RANKING-BASED INFORMATION PROCESSING

FIELD OF THE INVENTION

The present invention generally relates to information technology, and, more particularly, to a method and apparatus for information processing.

BACKGROUND OF THE INVENTION

It is estimated that large enterprises are witnessing tremendous yearly growth in information handling (more than 100%), based on the products and services that they offer. Processing significant parts of the information that is generated is important, so as to facilitate sound and timely decision making with regard to, e.g., policies and processes. Enterprise information systems usually connect to various sources across multiple internal and external third-party application systems.

If enterprises wish to adapt in real-time, they may need to monitor, integrate, analyze, and respond to high volume information from diverse applications and information sources. The amount of information to be considered can be hundreds of terabytes, depending on the granularity levels. One may encounter unstructured information from raw events on a particular enterprise metric from one of more sources, as well as aggregated information such as parts sales, ecommerce transactions, customer complaints, warranty claims, and the like.

Techniques such as filtering, integration, and summarization have been used for managing, searching and processing high volume enterprise information. Filtering is discussed in Y. Zhang, "Using Bayesian Priors to Combine Classifiers for Adaptive Filtering," in the Proceedings of SIGIR 2004. Integration is discussed in, e.g., Y. Arens et al., "Query reformulation for dynamic information integration," in the Journal of Intelligent Information Systems, 1996. Summarization is discussed in, e.g., M. Hu and B. Liu, "Mining and Summarizing Customer Reviews," in the Proc. of ACM SIG KDD, 2004. These are powerful techniques for managing high volume enterprise information. Nevertheless, the continued growth in the volume and complexity of information being handled requires continued progress.

It would thus be desirable to overcome the limitations in previous approaches.

SUMMARY OF THE INVENTION

Principles of the present invention provide techniques for ranking-based information processing. An exemplary method (which can be computer-implemented) for ranking-based information processing, according to one aspect of the invention, can include steps of integrating information from at least one source (a plurality of heterogeneous sources can also be handled), to obtain integrated information; mapping the integrated information to at least one application; ranking the integrated information based on the mapping and on ranking criteria from a knowledge base; and processing the integrated information, based on the ranking, to obtain processed integrated information.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, screening, ranking and scoring the most important information for users and/or systems to act on or process.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
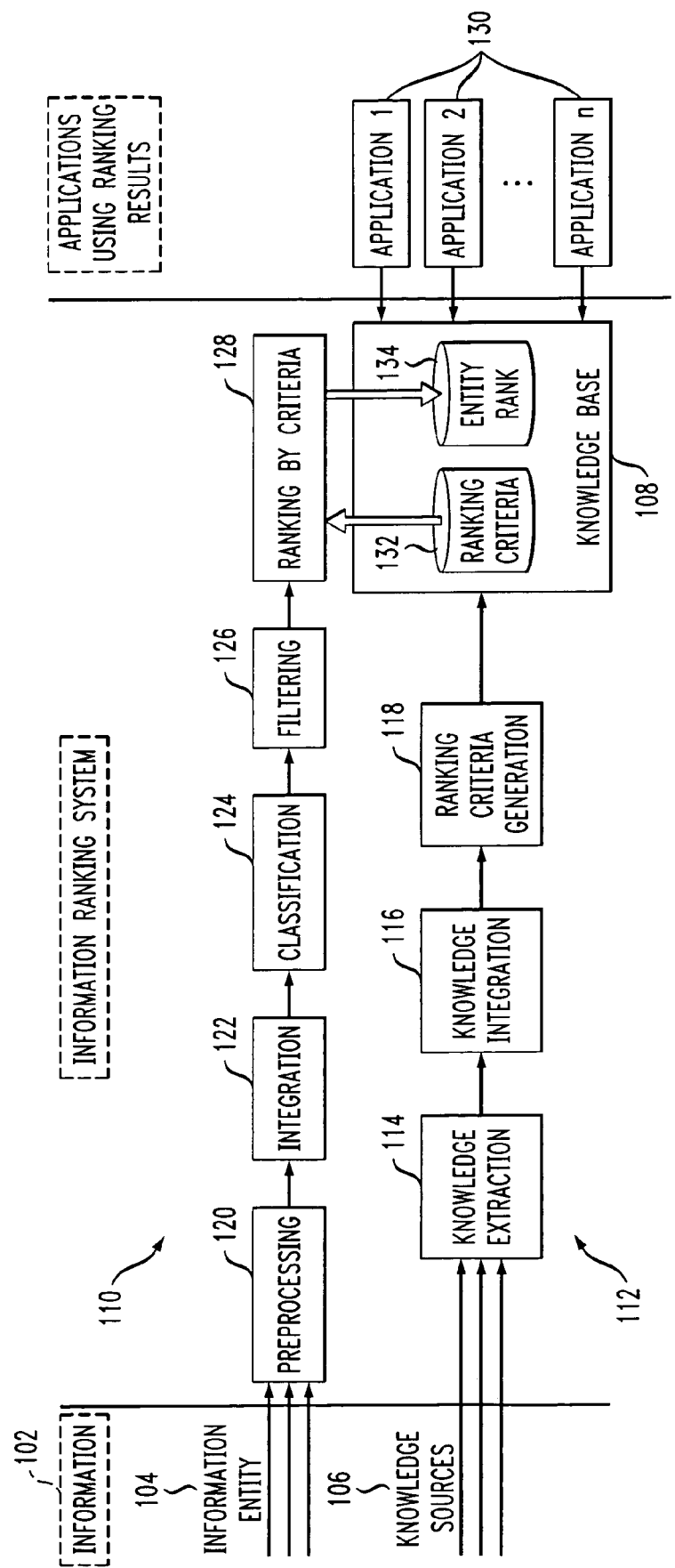
FIG. 1 is a block diagram depicting an exemplary embodiment of an apparatus for ranking-based information processing, according to an aspect of the present invention, which is also indicative of an exemplary data flow corresponding to exemplary method steps for ranking-based information processing.

FIG. 1 shows a system block diagram 100 depicting an exemplary embodiment of an apparatus for ranking-based information processing, according to an aspect of the present invention, which is also indicative of an exemplary data flow corresponding to exemplary method steps (which can be computer-implemented) for ranking-based information processing. The system 100 accepts information 102 that includes both information entity 104, to be consumed by applications, and that to be used for extracting process knowledge 106. The output of the system 100 can be, e.g., entity priority information which enriches knowledge base 108. The ranking information can benefit, for example, applications or human analysts performing intensive analysis on a large body of enterprise process information.

The exemplary system 100 contains two processes 110, 112. The latter builds up ranking criteria by integrating process knowledge, as shown at knowledge extraction and integration blocks 114, 116 and ranking criteria generation block 118. The former weighs information entities with ranks by applying ranking criteria, which can be, e.g., built-in. This is depicted at preprocessing block 120, integration block 122, classification block 124, filtering block 126, and ranking by criteria block 128.

By way of example and not limitation, several scenarios may instructively be considered. Enterprises may wish to know from parts sales (happening in the hundreds of thousands a month) what parts are being purchased, by whom, which models, and why. Further, enterprises may wish to know, from the aftermarket in the automotive industry, the failures, symptoms, parts that were replaced, and actions taken to fix vehicles. This information may spread across multiple applications including the Web. Therefore, processing and extracting knowledge from high-volume enterprise information entities and events in real-time is a major challenge for responsive enterprise systems.

One or more techniques disclosed herein may advantageously provide a ranking mechanism rooted in reasoning enterprise knowledge from various sources. Three major challenges may arise in this scenario due to the heterogeneity in information and environment. In the following we describe the three potential problems.

The first problem is source heterogeneity. Enterprise information is generated by different sources, including commercial databases in multi-parties, web sites, enterprise processes that can be wrapped with web services, and the like. These sources may be distinct not only in their formats but also in their natures. For example, in automotive enterprises, commercial databases provide manufacture information and aftermarket information such as warranty claims, parts availability, and prices, while some websites collect customer reviews and complaints. Consequently, source heterogeneity brings challenges in information integration and both knowledge extraction and integration.

The second potential problem is due to knowledge heterogeneity. The knowledge about the importance rank of information can be learned from various sources. For example, analysis on history information may provide predictions pertaining to the importance of future events; semantic knowledge about relations between information entities and objects in analysis is another exemplary type of knowledge. Integrating multi-dimensional enterprise knowledge and building uniform ranking criteria is the second exemplary challenge regarding heterogeneity.

Finally, a ranking mechanism should be adaptive to a given enterprise environment, this issue is referred to herein as the problem of context heterogeneity. The importance of enterprise information depends on a dynamic environment with variables and parameters such as time, location, user's activity, etc.

The three types of heterogeneity discussed above may be advantageously handled in the two processes 110, 112.

By way of example and not limitation, knowledge heterogeneity is discussed herein in connection with the importance of combining multi-dimensional enterprise knowledge. Integrating enterprise knowledge from various sources may be particularly useful. However, no limitation in scope is intended, and approaches to deal with other two challenges are also discussed.

One or more techniques disclosed herein may provide a general filtering framework and a family of ranking mechanisms for extracting crucial knowledge from high-volume enterprise information management.

Handling Source Heterogeneity and Context Heterogeneity

The ranking process 110, can handle source heterogeneity, i.e., the differences in information sources. Source heterogeneity can be dealt with using two models, preprocessor 120 and integrator 122. Source-specific preprocessing 120 prepares data using techniques such as format transformation. Information integration 122 handles the differences in the interface of data sources. Semantic-based information integration can facilitate the integration from heterogeneous sources. Given the teachings herein, one can adapt well-known techniques such as those disclosed in M. Chen et al., "Semantic Query Transformation for Integrating Web Information Sources," in Proc. of ICEIS 2005.

Classification as per block 124 associates enterprise information to the applications that consume the information. By differentiating enterprise information by interesting parties, one can apply filtering rules based on the requirement profiles of the applications.

Context heterogeneity can be dealt with in either ranking process or ranking criteria generation. One approach takes static enterprise knowledge and generates multi-dimensional ranking criteria that align with context profiles. Therefore, in applying ranking criteria, an application can extract ranking results according to its context profile. This approach is referred to herein as static context-based ranking. Alternatively, context information can become a knowledge source to form ranking criteria on the fly. This approach is referred to herein as run-time context-based ranking.

Ranking Criteria Generation Considering Knowledge Heterogeneity

Enterprise knowledge that is used to build ranking criteria can be extracted from multiple sources, such as ontology of information, to describe relations between components, analysis results on history information, etc. To deal with knowledge heterogeneity, one exemplary ranking criteria generation uses a two-phase model.

In phase 1, knowledge is learned from each knowledge source using independent learning algorithms. For example, various mining techniques can be applied to learn enterprise trends from history information and to predict enterprise behaviors in the future. The correlation of an information entity to the next event as predicted can be used to determine the importance of the information entity. Besides the analytics results, semantic knowledge that describes the relation between information objects provides another knowledge source for ranking. Consider an exemplary case wherein automotive analysts set the engine as a critical system to monitor. Then, the information about the components that have dramatic influences on engine performance should also carry high weights. There are many other sources for extracting knowledge with regard to information importance.

With ranking knowledge learned from multiple sources using independent learning algorithms, phase 2 integrates the ranking knowledge together and forms unified ranking criteria. One possible inventive integration technique takes a weighted average of ranking results along various knowledge dimensions as shown in the following formula:

$$S = \frac{\sum_i (W_i \cdot V_i)}{\sum_i W_i} \quad (1)$$

Where
$V_i$: value of dimension i
$W_i$: weight of dimension i

In the above formula, the weighting function is significant for balancing the effects of different and independent types of knowledge. Several mechanisms can be used to determine the weights. Manual weighting refers to the method that uses pre-defined weights given by domain experts. Confidence-based weighting is an approach that weighs a ranking result according to the confidence in the result, which may be especially suitable when the resulting knowledge is generated based on prediction or from limited samples. Hybrid weighting combines both manual weighting and confidence-based weighting by allowing users set weights for some knowledge dimensions while automatically giving weights to the others.

Using any weighting approach, the ranking function should be normalized both within each knowledge dimension and across dimensions. Normalization within each knowledge dimension is performed to keep ranking results independent from one dimension to another. Normalization across dimensions controls the domain of the final ranking results.

As noted, FIG. 1 is not only an exemplary system block diagram, but also an exemplary flow chart. It will be appreciated that a method for ranking-based information processing can include the steps of integrating information from at least one source, or indeed from a plurality of heterogeneous sources, as at block 122, to obtain integrated information; mapping the integrated information to at least one application, for example, using a classifier 124; ranking the integrated information based on the mapping and on ranking criteria from a knowledge base 108, as at block 128 and processing the integrated information, based on the ranking, to obtain processed integrated information (for example, via one or more applications interfacing with the entity rank of knowledge base 108 (which also can hold the ranking criteria)). Thus, if desired, the integrated information can be mapped to a plurality of applications 130, and the processing step can include formatting the processed integrated information for the plurality of applications. The knowledge base 108 can include the aforementioned ranking criteria store 132 and entity rank store 134. The ranking criteria can be stored in the ranking criteria store, and the results of the ranking of the integrated information can be stored in the entity rank store.

Additional steps can include obtaining the information from the plurality of heterogeneous sources (e.g., information entities 104), and preprocessing the information, as at block 120, to facilitate the integrating step. Further, additional steps can include extracting process knowledge, as at block 114, from a plurality of process knowledge sources 106, and obtaining ranking criteria for the knowledge base, such as via ranking criteria generation 118, based at least on the process knowledge.

A further additional step of normalizing the process knowledge to obtain normalized process knowledge can be conducted (for example, as part of knowledge integration block 116), wherein the process knowledge on which the ranking criteria are based is the normalized process knowledge.

The ranking can be based at least on, e.g., a weighted average along a plurality of knowledge dimensions, a polynomial ranking function, and/or an exponential ranking function.

EXAMPLE

Ranking Automotive Parts for Failure Analysis

A ranking-based information filtering framework for aftermarket analysis on vehicle failures will be demonstrated to illustrate one of many potential applications for one or more inventive techniques set forth herein. In a world-class automotive company, quality analysts may face a large body of information about auto failures. The information to be analyzed may comes from, e.g. warranty claims, call centers, suppliers, partners, customer reviews, sensor systems, etc. Information filtering can facilitate information processing in such an environment.

Figure 2:
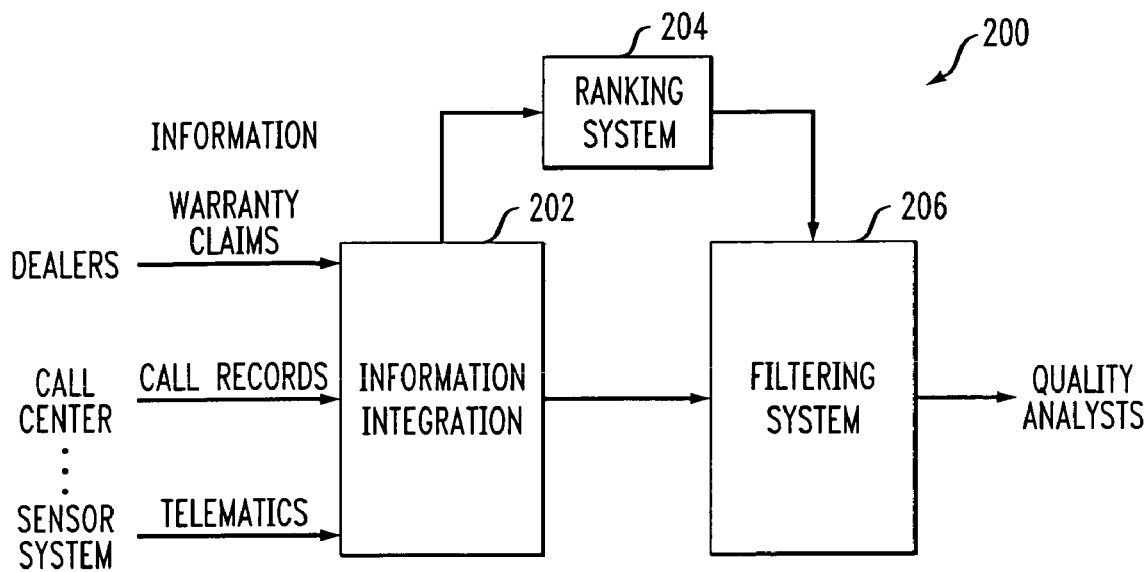
FIG. 2 is one specific exemplary instantiation of an apparatus and method as depicted in FIG. 1.

FIG. 2 depicts a conceptual information processing system 200 that filters enterprise information based on a ranking mechanism. Integration of a variety of information is performed by information integration block 202, with ranking by block 204 and filtering by block 206. The information integrated by block 202 can include, e.g., warranty claims from dealers, call records from a call center, telematics from a sensor system, and the like. Block 202 can correspond, e.g., to blocks 120 and 122 in FIG. 1, block 204 can correspond, e.g., to blocks 124-128 and process 112 in FIG. 1, with block 206 corresponding to knowledge base 108 interacting with one or more applications 130.

The above ranking-based filtering system aims at help quality analysts focus on important information. This example assumes that information can be categorized according to vehicle parts. Therefore, the ranking system identifies important parts, and only the information that is associated with these parts is transferred to quality analysts. The ranking system can also work, e.g., with a sorting system that lists information according to importance scores.

By way of example and not limitation, one ranking mechanism can be based on the Key Performance Indicator (KPI) for automotive aftermarket service. The KPIs used can include cost to repair vehicles and customer satisfaction. The former can be quantified as the total cost and the labor hours to repair a car, while the latter can be quantified as the number of failures. Intrinsically, the parts with high repair cost and high failure rate should be given more attention. Using the above KPIs, one objective of the ranking mechanism can be to determine a few vehicle parts that dominate repair cost, labor hours and number of failures.

Ranking Techniques

Assuming that all three metrics, namely, repair cost (C), labor hours (L), and number of failures (N), have equal importance to a manufacturer, one can measure the importance of a part (I) using the following formula:

$$S_i = \frac{C}{Max\{C\}} + \frac{L}{Max\{L\}} + \frac{N}{Max\{N\}} \quad (2)$$

Where:

C: total repair cost of the part i

L: total labor hours for reparing the part i

N: number of failures of the part i

The above formula integrates three dimensions of information regarding part importance according to KPIs. The value of each dimension is the total amount observed for the given part until the ranking time. Using accumulative history regarding a part, driven by the KPIs, one can measure the macro-view of the service performance of each part rather than that of each individual vehicle. The above equation is scalable with the amount of information we learn about each part when using auxiliary data structures to update the information for each part and dimension incrementally.

The value of a dimension is mapped (normalized) to the range [0, 1.0] so that the maximum value of each dimension carries a value of 1.0. This transformation allows an equal influence to the importance score I of a part from multiple dimensions. When the ranking function should give different weights to different dimensions, the weights can be assigned separately. Note that one could instead choose to map to the range [0, 100.0], or some other convenient range.

The following pseudo-code shows an inventive ranking technique that updates importance scores of parts daily. In this technique, K is a parameter to determine the scope of selected parts. The results of the ranking algorithm are employed as input to the filtering system in FIG. 2 to filter out some or all of the information that does not relate to the parts determined to be important.

```
Ranking technique:
During day time:
    For each warranty claim
        Add repair cost to the total cost of the failed part
        Add labor hours to the total labor hours of the failed
part
        Increase the total number of failures of the failed part
by 1
At the end of a day:
    For each part
        Calculate importance score of the part using equation 2
```

Figure 3:
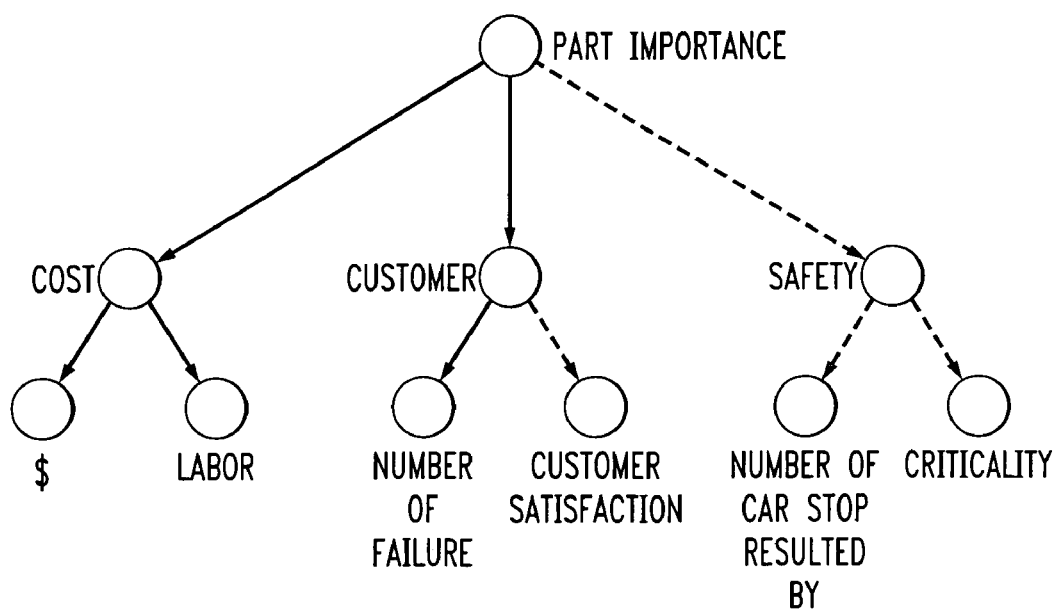
FIG. 3 shows exemplary importance factors for a typical vehicle part, one of many possible applications of one or more inventive techniques.

FIG. 3 shows some factors affecting the importance of parts. The cost factor addresses concerns about financial issues; the customer factor measures customer satisfaction, and the safety factor addresses the severity of a part failure causing unsafe conditions. Each parent factor may combine several child factors, and the knowledge can be provided manually by human experts or can be learned via analytical techniques. For example, the influence of a part on customer satisfaction can be estimated from the number of car failures caused, or can be extracted form a customer survey. The solid lines link to the factors that are addressed in the example provided. FIG. 3 is exemplary of one possible way to rank, namely, with a ranking tree. Each attribute is placed in a category, one weighs each attribute, and the categories can also be weighted. The bottom row represents leaf nodes; these are the attributes that get mapped to; each one has a weight. The entries in the middle row are categories. It will be appreciated that multiple levels are possible but are omitted for illustrative clarity.

It should be appreciated that an example has been presented within the context of automotive parts, but one or more inventive techniques can be adapted to a wide variety of problems.

Given the teachings herein, it will be appreciated that one or more well-known ranking mechanisms widely applied in information retrieval (IR) can be adapted for ranking-based information processing. Examples include Google® ranking technology, described at http://www.google.com/technology/, and the technology described in J. Kleinberg, "Authoritative sources in a hyperlinked environment," Journal of the ACM 46 (1999). When dealing with large data sets, as in information retrieval, it may be desirable to rank information entities according to their importance. Unlike traditional studies on IR, which deal with web information, one or more inventive ranking mechanisms herein can focus on knowledge extraction in an enterprise environment. One or more inventive techniques can be configured to deal with diverse heterogeneous information sources such as web information, sensing systems, and the like (from whence can arise the three types of heterogeneity discussed above).

If considering applications that need to query enterprise information in real-time, one or more inventive approaches can be extended using techniques for processing queries over stream data. Skilled artisans will be familiar with the STREAM project at Stanford University, which aims to develop a general-purpose system for processing continuous queries over multiple continuous data streams and stored relations. See A. Arasu et al., "STREAM: The Stanford Stream Data Manager Demonstration description—short overview of system status and plans," in Proc. of the ACM Intl Conf. on Management of Data (SIGMOD 2003), June 2003. One significant capability of STREAM is handling high-volume and bursty data streams and complex continuous queries. Borealis (formerly known as Aurora) at Brown University has been described as a second-generation SPE (Stream Processing Engine). See Daniel J Abadi, et al., "The Design of the Borealis Stream Processing Engine," Second Biennial Conference on Innovative Data Systems Research (CIDR 2005), Asilomar, Calif., January 2005. When addressing the two challenges of simultaneously optimizing different quality of service (QoS) metrics and optimizing at multiple levels of granularity of a given system, Abadi and his colleagues point out the importance of dynamically revising query results and query specifications. Similar principles may be of interest with the inventive techniques herein.

Figure 4:
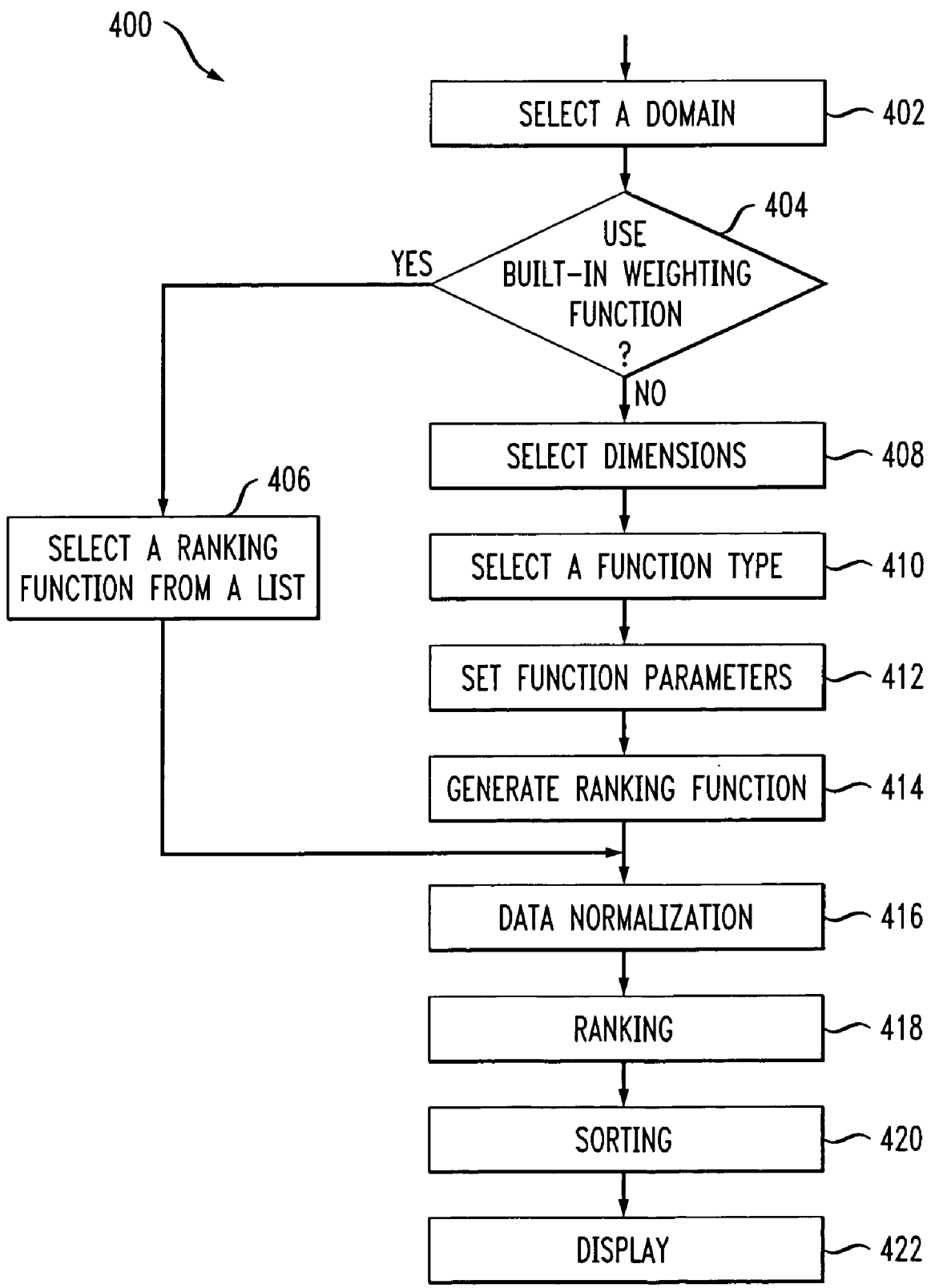
FIG. 4 is a flow chart of exemplary method steps that can be implemented, e.g., by a ranking-based display tool.

FIG. 4 shows workflow in a flow chart 400 for an exemplary ranking-based display tool for, e.g., data experts. The left flow can be taken when applying built-in ranking or weighting functions based on objective enterprise metrics such as KPIs. The framework also permits input based on domain knowledge. Domain experts can tune the ranking criteria by choosing some or all dimensions, the parameters, and the function type for the utility function. It will be appreciated that the depicted techniques are adaptable and extensible for different solution requirements.

Still referring to FIG. 4, the ranking criteria discussed with respect to FIG. 1 can, if desired, be obtained as shown. Step 402 includes obtaining a domain selection. Step 404 includes obtaining a decision whether to employ a built-in ranking function. If decision block 404 is affirmative (left side), step 406 includes obtaining a selection of the ranking function from a list, the list being related to the domain selection. If decision block 404 is negative (right side), step 408 includes obtaining a selection of dimensions, step 410 includes obtaining a selection of a function type, step 412 includes setting function parameters, and step 414 includes generating a non-built-in ranking function. One or more of the obtaining the selection of dimensions, the obtaining the selection of the function type, and the setting of the function parameters is based at least on the domain selection.

Step 416 can include normalizing event data to obtain normalized event data. Step 418 can include ranking the normalized event data to obtain ranked normalized event data. Step 420 can include sorting the ranked normalized event data to obtain the integrated information for the processing. If desired, instead of or in lieu of using the information for processing, one can format the integrated information for display, as at block 422.

It will be appreciated that ranking functions generally apply to particular domains, and that when a function is to be selected from a list, the list presented will typically depend on the domain. Further, the dimensions, function type and function parameters will normally depend on the domain, e.g., warranty claims. Data normalization block 416 generally normalizes data from actual events, e.g., warranty claims. Such claims may have attributes that can be normalized, for example, ranking on labor costs to permit a meaningful comparison with the number of parts replaced. Each ranking function type (e.g., a weighted tree) can have parameters. Various ranking criteria are those things deemed important. Thus, in a formula, the variables could be normalized event attributes and the parameters could be the constants.

One or more inventive techniques can deal with source heterogeneity, knowledge heterogeneity and context heterogeneity in integrating and analyzing information from heterogeneous sources. The example case study on automotive failure analysis is illustrative of general techniques to build and apply ranking knowledge for determining key enterprise information.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 5:
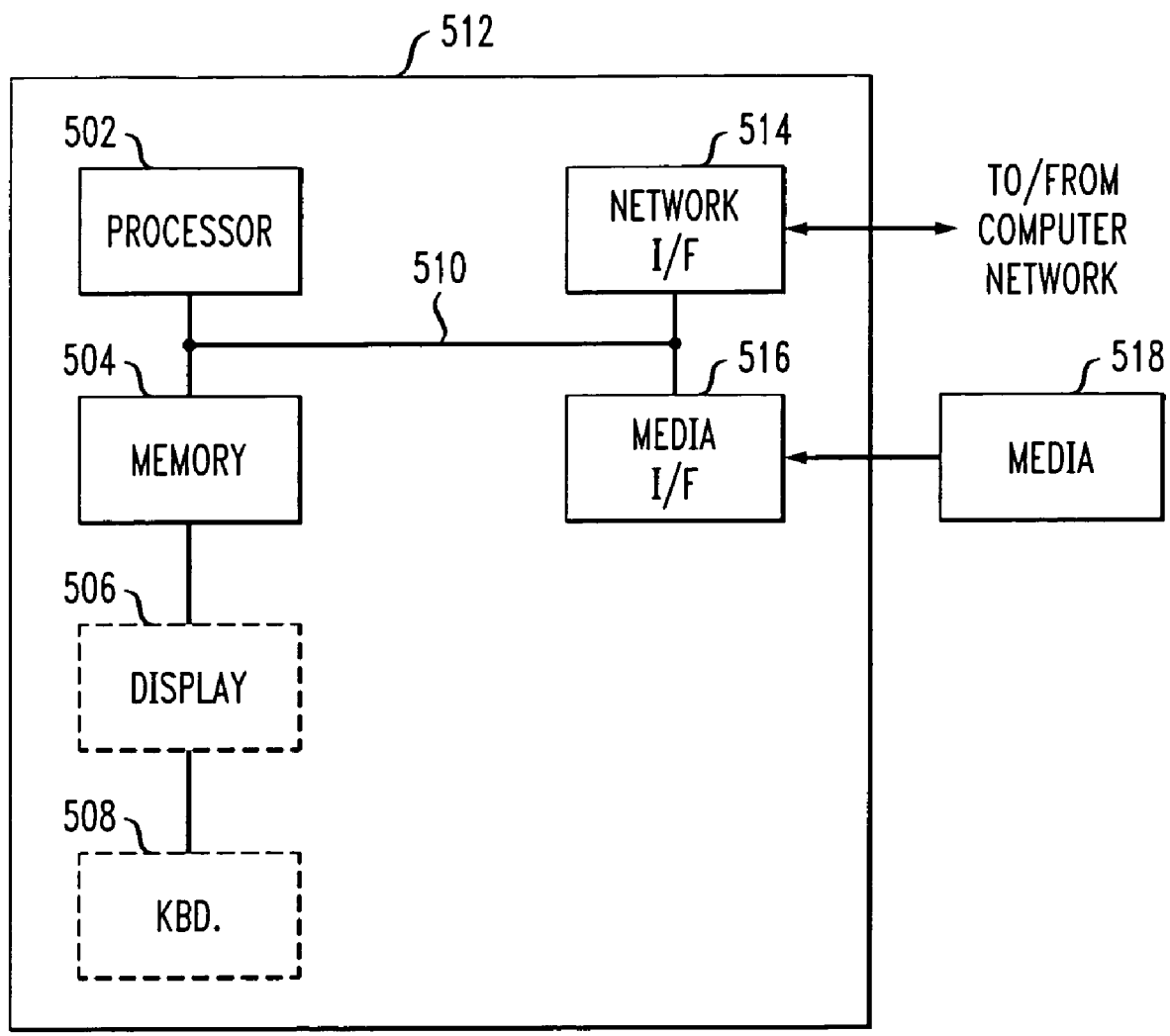
FIG. 5 depicts a computer system that may be useful in implementing one or more aspects and/or elements of the present invention.

At present, it is believed that the preferred implementation will make substantial use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 504), magnetic tape, a removable computer diskette (e.g. media 518), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for ranking-based information processing, said method comprising the steps of:
   integrating information from at least one source, to obtain integrated information;
   mapping said integrated information to at least one application;
   ranking said integrated information based on said mapping and on ranking criteria from a knowledge base;
   processing said integrated information, based on said ranking, to obtain processed integrated information;
   extracting process knowledge from a plurality of process knowledge sources;
   obtaining ranking criteria for said knowledge base, based at least on said process knowledge;
   and formatting said integrated information for display;
wherein:
   in said integrating step, said information is from a plurality of heterogeneous sources, and wherein said integrating step comprises integrating said information from said plurality of heterogeneous sources, to obtain said integrated information, said integrated information comprising warranty claims for automotive repair with an identification of corresponding failed parts;
   said obtaining of said ranking criteria comprises:
obtaining a domain selection, said domain selection comprising automotive quality control;
obtaining a decision whether to employ a built-in ranking function;
and responsive to said decision being affirmative, obtaining a selection of said ranking function from a list, said list being related to said domain selection;
   said ranking step comprises:
normalizing event data to obtain normalized event data;

ranking said normalized event data to obtain ranked normalized event data, said ranking of said normalized event data in turn comprising:

during a given day, for each of a plurality of said warranty claims, increasing total cost, labor hours, and total number of failures for an appropriate one of said corresponding failed parts; and ranking importance of said corresponding failed parts based on the equation $$Si = \frac{C}{\text{Max}\{C\}} + \frac{L}{\text{Max}\{L\}} + \frac{N}{\text{Max}\{N\}}$$

where:

C is total repair cost of part i;

L is total labor hours for repairing part i, and

N is total number of failures of part i;

said ranking further comprises updating a stored representation in a computer memory, said stored representation representing failure of said failed parts, said failed parts being tangible physical items; and sorting said ranked normalized event data to obtain said integrated information for said processing.

\* \* \* \* \*